United States Patent
Liao et al.

(10) Patent No.: US 10,372,619 B2
(45) Date of Patent: Aug. 6, 2019

(54) DATA BACKUP METHOD, DATA RECOVERY METHOD AND STORAGE CONTROLLER

(71) Applicant: SHENZHEN EPOSTAR ELECTRONICS LIMITED CO., Shenzhen (CN)

(72) Inventors: Shih-Tien Liao, Hsinchu (TW); Min-Yao Mei, Chiayi (TW); Hao-Cing Jhou, New Taipei (TW)

(73) Assignee: SHENZHEN EPOSTAR ELECTRONICS LIMITED CO., Shenzhen (CN)

( * ) Notice: Subject to any disclaimer, the term of this patent is extended or adjusted under 35 U.S.C. 154(b) by 0 days.

(21) Appl. No.: 15/905,828

(22) Filed: Feb. 27, 2018

(65) Prior Publication Data
US 2019/0087348 A1 Mar. 21, 2019

(30) Foreign Application Priority Data
Sep. 18, 2017 (TW) .............................. 106131875 A

(51) Int. Cl.
G06F 12/1009 (2016.01)
G06F 12/0891 (2016.01)

(52) U.S. Cl.
CPC ...... *G06F 12/1009* (2013.01); *G06F 12/0891* (2013.01); *G06F 2212/1032* (2013.01)

(58) Field of Classification Search
None
See application file for complete search history.

(56) References Cited

U.S. PATENT DOCUMENTS

| 9,383,926 B2 | 7/2016 | Law |
| 2014/0095767 A1 | 4/2014 | Trika et al. |
| 2014/0207997 A1* | 7/2014 | Peterson ............. G06F 12/0246 711/103 |

(Continued)

FOREIGN PATENT DOCUMENTS

| TW | 201117001 | 5/2011 |
| TW | I488041 | 6/2015 |
| TW | 201712540 | 4/2017 |

OTHER PUBLICATIONS

"Office Action of Taiwan Counterpart Application," dated Dec. 28, 2018, p. 1-p. 3.

*Primary Examiner* — Michael Alsip
(74) *Attorney, Agent, or Firm* — JCIPRNET

(57) ABSTRACT

A data backup method is provided. The data backup method includes maintaining a logical-to-physical table (L2P table) in a memory, where the L2P table records a plurality of physical addresses respectively corresponding to a plurality of first logical addresses and a plurality of trim marks; receiving a trim command, wherein the trim command indicates that data stored in one or more second logical addresses is invalid; according to the trim command, not clearing physical addresses respectively corresponding to the second logical addresses in the L2P table, and changing trim marks respectively corresponding to the second logical addresses from a first bit value to a second bit value; and when a predetermined condition is met, updating the L2P table according to the trim marks, and storing the updated L2P table into a rewritable non-volatile memory module.

10 Claims, 13 Drawing Sheets

(56) References Cited

U.S. PATENT DOCUMENTS

2014/0281333 A1* 9/2014 Peterson ............ G06F 12/0638
                                                                           711/170
2017/0228154 A1   8/2017 Liu et al.

* cited by examiner

DATA BACKUP METHOD, DATA RECOVERY METHOD AND STORAGE CONTROLLER

CROSS-REFERENCE TO RELATED APPLICATION

This application claims the priority benefit of Taiwan application serial no. 106131875, filed on Sep. 18, 2017. The entirety of the above-mentioned patent application is hereby incorporated by reference herein and made a part of this specification.

BACKGROUND OF THE INVENTION

Field of the Invention

The invention relates to a data backup method and a data recovery method, and particularly relates to a data backup method, a data recovery method and a storage controller adapted to a storage device having a rewritable non-volatile memory module.

Description of Related Art

Generally, a host system may use a trim command to notify a storage device (for example, a solid state disk (SSD)) having a rewritable non-volatile memory module with those physical units (physical blocks) in which data is no longer considered to be in use (i.e. invalid data), and these physical units may be erased. A controller of the storage device may mark physical unit addresses corresponding to logical unit addresses indicated by trim information as invalid according to the trim information of the trim command, such that in subsequent operations, based on the physical unit addresses marked as invalid, the controller may identify that data stored in the physical unit addresses is invalid data, so as to improve management efficiency of the storage device. For example, based on the invalid data marked by the trim command, efficiency of a garbage collection operation is improved.

To be specific, the controller generally maintains a logical-to-physical table (L2P table) to monitor a mapping state of the whole logical units and the physical units. However, a disadvantage of the L2P table is that the controller needs to update and store the L2P maintained in a memory (for example, a RAM) to the storage device at a specific time. Otherwise, the L2P table disappears at next bootup.

Namely, if a sudden power-off event occurs, the garbage collection operation executed according to the invalid data marked by the trim command may result in correctness reduction of the reconstructed L2P table. Defects of the conventional method are described below with reference of FIGS. 4A-4D.

FIG. 4A is a schematic diagram of a L2P table drawn according to the conventional technique. Referring to FIG. 4A, it is assumed that the rewritable non-volatile memory module of the storage device has stored a L2P table 400, i.e. the L2P table (NAND), and at a time T0, the controller of the storage device may read the L2P table 400 from the rewritable non-volatile memory module, and store the same in a memory of the storage device (shown by an arrow A400), such that the storage device may swiftly update a L2P table 401 (i.e. the L2P table (RAM)) maintained in the memory based on a feature of quick access of the memory. Moreover, it is assumed that a physical unit 41 of the rewritable non-volatile memory module respectively stores data D411, D412, D413, D414. The above data is valid data (shown in a gray background).

FIG. 4B is a schematic diagram of updating the L2P table according to a trim command based on the conventional technique. Referring to FIG. 4B, at a time T1, the controller receives a trim command TC1, and the controller updates the L2P table 401 into a L2P table 402 according to the trim command TC1 (shown by an arrow A401). The trim command TC1 is used for indicating that data stored in a logical address section LS1 is invalid. To be specific, the trim command TC1 includes a start logical address (for example, "LBA(0)") and a section length (for example, "2") of the logical address section LS1. The physical addresses corresponding to the logical addresses LBA(0), LBA(1) of the logical address section LS1 of the updated L2P table 402 are modified to "0" (i.e. cleared). Namely, according to the L2P table 402, it is known that the current logical addresses LBA(0), LBA(1) do not store valid data. The controller learns that data stored in physical pages 41(1), 41(2) of the physical unit 41 is invalid (invalid data, shown by diamond grids).

FIG. 4C is a schematic diagram of updating the L2P table according to an executed garbage collection command based on the conventional technique. Referring to FIG. 4C, at a time T2, the controller receives a garbage collection command, and correspondingly executes the garbage collection operation to the physical unit 41. According to the L2P table 402, the controller copies valid data D413, D414 of the physical unit 41 to a new physical unit 42 (not to copy valid data D411, D412), and erases the physical unit 41, such that the physical unit 41 may be continually used later, so as to complete collecting the physical unit 41 (shown by an arrow A402). It should be noted that according to the new physical addresses used for storing the data D413, D414, the L2P table 402 is correspondingly updated to a L2P table 403 (shown by an arrow A403).

FIG. 4D is a schematic diagram of reconstructing a L2P table according to the conventional technique. It is assumed that a sudden power-off event occurs at a time T3, and at a time T4, the storage device starts to execute an operation of reconstructing the L2P table. In the beginning, the controller reads the L2P table 400 from the rewritable non-volatile memory module, and stores the same as the L2P table 401 in the memory of the storage device (shown by an arrow A404). Then, the controller updates the L2P table 401 according to the physical addresses and logical addresses of the valid data of the physical unit 42 with a writing time later than the L2P table 400 (shown by an arrow 405), so as to obtain the reconstructed (updated) L2P table 404 (shown by an arrow 406).

It should be noted that physical addresses respectively corresponding to the logical addresses LBA(0), LBA(1) of the reconstructed L2P table 404 are "41_1" and "41_2" (which represents that data stored in the logical addressees LBA(0), LBA(1) has been written into a $1^{st}$ physical page and a $2^{nd}$ physical page of the physical unit 41). However, the physical unit 41 has been erased due to the garbage collection operation, i.e. the physical unit 41 does not store any data. Therefore, the reconstructed L2P table 404 has error information (the logical addresses LBA(0), LBA(1) should not store any data). In other words, after the garbage collection operation is executed, if the sudden power-off event occurs in case that the latest L2P table is still not backed up to the rewritable non-volatile memory module yet, correctness of the subsequent reconstructed L2P table would be decreased.

Therefore, it is one of the issues studied by related technicians of the field to resolve the error of the L2P table caused by the garbage collection operation and the sudden power-off event.

SUMMARY OF THE INVENTION

The invention is directed to a data backup method, a data recovery method and a storage controller, by which a corresponding data backup operation is performed by using a L2P table recording a trim mark, so as to resolve the problem, in the conventional practice, of correctness reduction, caused by a garbage collection operation, of the L2P table reconstructed through a data recovery operation.

An embodiment of the invention provides a data backup method, which is adapted to a storage device having a rewritable non-volatile memory module, wherein the rewritable non-volatile memory module has a plurality of physical units, and the rewritable non-volatile memory module is configured with a plurality of physical addresses, wherein a plurality of logical addresses is configured to a host system coupled to the storage device. The data backup method includes maintaining a first L2P table in a memory, where the first L2P table records a plurality of first trim marks respectively corresponding to the first logical addresses and a plurality of first physical addresses, respectively corresponding to the first logical addresses, among the physical addresses, wherein a preset value of the first trim marks is a first bit value; receiving a trim command from the host system, where the trim command indicates that first data stored in a logical address section is invalid; according to the trim command, not clearing second physical addresses, respectively corresponding to the one or more second logical addresses, among the first physical addresses of the first L2P table, and changing second trim marks, respectively corresponding to the one or more second logical addresses, among the first trim marks to a second bit value; and when a predetermined condition is met, updating the first L2P table according to the first trim marks, and storing a second L2P table to the rewritable non-volatile memory module according to the updated first L2P table, wherein the second L2P table only includes the first physical addresses respectively corresponding to the first logical addresses in the updated first L2P table, and does not include the first trim marks.

An embodiment of the invention provides a data recovery method, which is adapted to a storage device having a rewritable non-volatile memory module, where the rewritable non-volatile memory module has a plurality of physical units, and the rewritable non-volatile memory module is configured with a plurality of physical addresses, wherein a plurality of logical addresses is configured to a host system. The data recovery method includes loading a latest first L2P table stored in the rewritable non-volatile memory module to a memory to form a second L2P table, wherein the first L2P table and the second L2P table all record a plurality of first physical addresses, respectively corresponding to the logical addresses, among the physical addresses; updating the second L2P table according to physical addresses of valid data of which a writing time is later than the first L2P table in the rewritable non-volatile memory module and corresponding logical addresses; and recording a plurality of trim marks to the second L2P table to make the trim marks respectively correspond to the logical addresses of the second L2P table, wherein a preset value of the trim marks is a first bit value.

An embodiment of the invention provides a storage controller used for controlling a storage device having a rewritable non-volatile memory module. The storage controller includes a connection interface circuit, a memory interface control circuit and a processor. The connection interface circuit is coupled to a host system, wherein a plurality of logical addresses is configured to the host system. The memory interface control circuit is coupled to the rewritable non-volatile memory module, where the rewritable non-volatile memory module has a plurality of physical units, and the rewritable non-volatile memory module is configured with a plurality of physical addresses. The processor is coupled to the connection interface circuit and the memory interface control circuit. Moreover, the processor maintains a first L2P table in a memory, where the first L2P table records a plurality of first trim marks respectively corresponding to the first logical addresses and a plurality of first physical addresses. respectively corresponding to the first logical addresses, among the physical addresses, wherein a preset value of the first trim marks is a first bit value. The processor receives a trim command from the host system, wherein the trim command indicates that first data stored in a logical address section is invalid, wherein the logical address section includes one or more second logical addresses. The processor does not clear second physical addresses, respectively corresponding to the one or more second logical addresses, among the first physical addresses of the first L2P table according to the trim command, and changes second trim marks, respectively corresponding to the one or more second logical addresses, among the first trim marks to a second bit value. Moreover, when a predetermined condition is met, the processor updates the first L2P table according to the first trim marks, and stores a second L2P table to the rewritable non-volatile memory module according to the updated first L2P table, where the second L2P table only includes the first physical addresses respectively corresponding to the first logical addresses of the updated first L2P table, and does not include the first trim marks.

An embodiment of the invention provides a storage controller used for controlling a storage device having a rewritable non-volatile memory module. The storage controller includes a connection interface circuit, a memory interface control circuit and a processor. The connection interface circuit is coupled to a host system, wherein a plurality of logical addresses is configured to the host system. The memory interface control circuit is coupled to the rewritable non-volatile memory module, wherein the rewritable non-volatile memory module has a plurality of physical units, and the rewritable non-volatile memory module is configured with a plurality of physical addresses. The processor is coupled to the connection interface circuit and the memory interface control circuit. Moreover, the processor loads a latest first L2P table stored in the rewritable non-volatile memory module to a memory to form a second L2P table, wherein the first L2P table and the second L2P table all record a plurality of first physical addresses, respectively corresponding to the logical addresses, among the physical addresses. Moreover, the processor updates the second L2P table according to physical addresses of valid data of which a writing time is later than the first L2P table in the rewritable non-volatile memory module and corresponding logical addresses, and the processor further records a plurality of trim marks to the second L2P table to make the trim marks respectively correspond to the logical addresses of the second L2P table, wherein a preset value of the trim marks is a first bit value.

According to the above description, the data backup method, the data recovery method and the storage controller provided by the invention may use the trim marks recorded in the L2P table to update the trim marks and the L2P table according to the received trim command, the garbage collection command, the writing command and the executed L2P table backup operation, so as to avoid the problem of correctness reduction of the reconstructed L2P table in case that the sudden power-off event occurs when the latest L2P table has not been backed up to the rewritable non-volatile memory module yet, and improve performance and security of the storage device of the storage device having the rewritable non-volatile memory module.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the present embodiment, a storage device includes a rewritable non-volatile memory module and a storage device control (which is also referred to as a storage controller or a storage control circuit). Moreover, the storage device is used together with a host system, and the host system may write data into the storage device or read data from the storage device.

Figure 1:
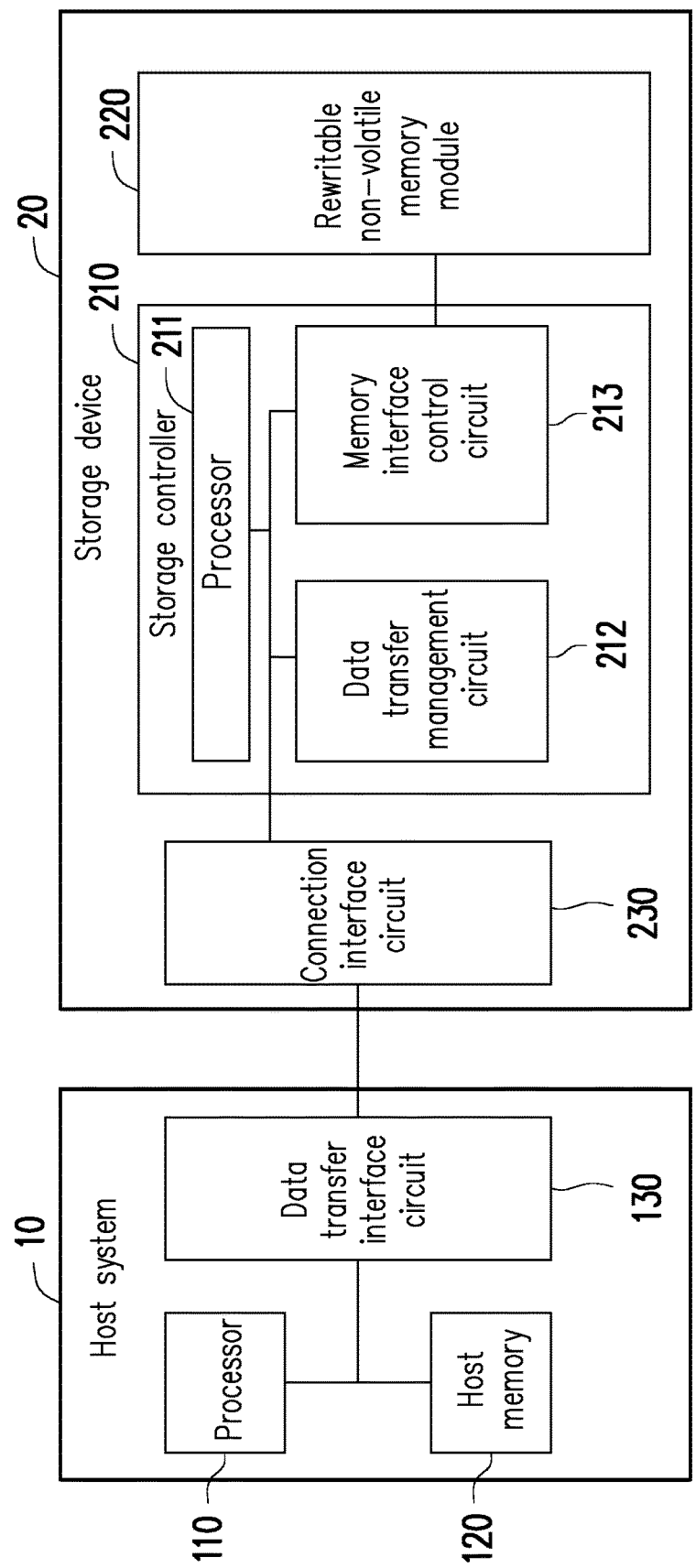
FIG. 1 is a block schematic diagram of a host system and a storage device according to an embodiment of the invention.

FIG. 1 is a block schematic diagram of a host system and a storage device according to an embodiment of the invention.

Referring to FIG. 1, the host system 10 includes a processor 110, a host memory 120 and a data transfer interface circuit 130. In the present embodiment, the data transfer interface circuit 130 is coupled (i.e. electrically connected to) the processor 110 and the host memory 120. In another embodiment, the processor 110, the host memory 120 and the data transfer interface circuit 130 are coupled to each other through a system bus.

The storage device 20 includes a storage controller 210, a rewritable non-volatile memory module 220 and a connection interface circuit 230, where the storage controller 210 includes a processor 211, a data transfer management circuit 212 and a memory interface control circuit 213.

In the present embodiment, the host system 10 is coupled to the storage device 20 through the data transfer interface circuit 130 and the connection interface circuit 230 of the storage device 20 to implement a data access operation. For example, the host system 10 may store data to the storage device 20 or read data from the storage device 20 through the data transfer interface circuit 130.

In the present embodiment, the processor 110, the host memory 120 and the data transfer interface circuit 130 may be disposed on a motherboard of the host system 10. The number of the data transfer interface circuit 130 may be one or plural. Through the data transfer interface circuit 130, the motherboard may be coupled to the storage device 20 through a wired or wireless manner. The storage device 20 is, for example, a flash drive, a memory card, a solid state disk (SSD) or a wireless memory storage device. The wireless memory storage device is, for example, a memory storage device based on various wireless communication techniques such as a near field communication (NFC) memory storage device, a WiFi memory storage device, a Bluetooth memory storage device or a low power consumption Bluetooth memory storage device (for example, iBeacon), etc. Moreover, the motherboard may also be coupled to a global positioning system (GPS) module, a network interface card, a wireless transmission device, or various I/O devices such as a keyboard, a screen, a mouse, a loudspeaker, etc. through the system bus.

In the present embodiment, the data transfer interface circuit 130 and the connection interface circuit 230 are interface circuits compatible to a peripheral component interconnect express (PCI express) standard. Moreover, the data transfer interface circuit 130 and the connection interface circuit 230 implement data transmission therebetween by using a non-volatile memory express (NVMe) communication protocol.

However, it should be noted that the invention is not limited thereto, and the data transfer interface circuit 130 and the connection interface circuit 230 may also be complied with a parallel advanced technology attachment (PATA) standard, an institute of electrical and electronics engineers (IEEE) 1394 standard, a serial advanced technology attachment (SATA) standard, a universal serial bus (USB) standard, a SD interface standard, an ultra high speed-I (UHS-I) interface standard, an ultra high speed-II (UHS-II) interface standard, a memory stick (MS) interface standard, a multi-chip package interface standard, a multi media card (MMC) interface standard, an eMMC interface standard, a universal flash storage (UFS) interface standard, an eMCP interface standard, a CF interface standard, an integrated device electronics (IDE) standard or other suitable standards. Moreover, in another embodiment, the connection interface circuit 230 and the storage controller 210 may be packaged in one chip, or the connection interface circuit 230 is disposed outside a chip containing the storage controller 210.

In the present embodiment, the host memory 120 is used for temporarily storing a command or data executed by the processor 110. For example, in the present exemplary embodiment, the host memory 120 may be a dynamic random access memory (DRAM), a static random access memory (SRAM), etc. However, it should be noted that the invention is not limited thereto, and the host memory 120 may also be other suitable memory.

The storage controller 210 is used for executing a plurality of logical gates or control commands implemented in a hardware form or firmware form, and performing data writing, reading, and erasing operations on the rewritable non-volatile memory module 220 according to commands of the host system 10.

To be specific, the processor 211 of the storage controller 210 is hardware having computation capability, and is used for controlling a whole operation of the storage controller 210. To be specific, the processor 211 has a plurality of control commands, and when the storage device 200 operates, the control commands are executed to execute the data writing, reading and erasing operations.

It should be noted that in the present embodiment, the processor 110 and the processor 211 are, for example, central processing units (CPU), micro-processors or other programmable microprocessors, digital signal processors (DSP), programmable controllers, application specific integrated circuits (ASIC), programmable logic devices (PLD) or other similar circuit devices, which are not limited by the invention.

In an embodiment, the storage controller 210 further has a read-only memory (not shown) and a random access memory (not shown). Particularly, the read-only memory had a boot code, and when the storage controller 210 is enabled, the processor 211 first executes the boot code to load the control commands stored in the rewritable non-volatile memory module 220 to the random access memory of the storage controller 210. Thereafter, the processor 211 may execute the control commands to perform the data writing, reading and erasing operations. In another embodiment, the control commands of the processor 211 may also be stored in a specific area of the rewritable non-volatile memory module 220 (for example, a physical unit in the rewritable non-volatile memory module 220 used for storing system data) in form of program code.

In the present embodiment, as described above, the storage controller 210 further includes the data transfer management circuit 212 and the memory interface control circuit 213. It should be noted that the operations executed by the components of the storage controller 210 may also be regarded as operations executed by the storage controller 210.

The data transfer management circuit 212 is coupled to the processor 211, the memory interface control circuit 213 and the connection interface circuit 230. The data transfer management circuit 212 is used for receiving instructions of the processor 211 to implement data transfer. For example, data is read from the host system 10 (for example, the host memory 120) through the connection interface circuit 230, and the read data is written into the rewritable non-volatile memory module 220 through the memory interface control circuit 213 (for example, the writing operation is performed according to a writing command coming from the host system 10). For another example, data may be read from one or more physical units of the rewritable non-volatile memory module 220 through the memory interface control circuit 213, and the read data is written to the host system 10 (for example, the host memory 120) through the connection interface circuit 230 (for example, the reading operation is performed according to a reading command coming from the host system 10). In another embodiment, the data transfer management circuit 212 may also be integrated into the processor 211.

The memory interface control circuit 213 receives an instruction of the processor 211, and performs the writing (which is also referred to as programming) operation, reading operation or erasing operation to the rewritable non-volatile memory module 220 in collaboration with the data transfer management circuit 212.

For example, the processor 211 may execute a writing command sequence (for example, in response to the writing command received from the host system) to instruct the memory interface control circuit 213 to write data to the physical units of the rewritable non-volatile memory module 220. The processor 211 may execute a reading command sequence to instruct the memory interface control circuit 213 to read data from one or more physical units, corresponding to the reading command, of the rewritable non-volatile memory module 220. The processor 211 may execute an erasing command sequence to instruct the memory interface control circuit 213 to perform an erasing operation to the rewritable non-volatile memory module 220. The writing command sequence, the reading command sequence and the erasing command sequence may respectively include one or more program codes or command codes and instruct to perform the corresponding writing, reading and erasing operation to the rewritable non-volatile memory module 220. In an embodiment, the processor 211 may also send other types of the command sequence to the memory interface control circuit 213 to execute the corresponding operation to the rewritable non-volatile memory module 220.

Moreover, the data to be written into the rewritable non-volatile memory module 220 is converted into a format that may be accepted by the rewritable non-volatile memory module 220 by the memory interface control circuit 213. To be specific, if the processor 211 is about to access the rewritable non-volatile memory module 220, the processor 211 may send the corresponding command sequences to the memory interface control circuit 213 to instruct the memory interface control circuit 213 to execute the corresponding operations. For example, the command sequences include the writing command sequence instructing to write data, the reading command sequence instructing to read data, the erasing command sequence instructing to erase data, and corresponding command sequences instructing various memory operations (for example, to change a read voltage set level or execute a garbage collection procedure, etc.). These command sequences may include one or more signals, or data on a bus. These signals or data may include command codes or program codes. For example, the reading command sequence may include information of reading identification codes, memory addresses, etc.

The rewritable non-volatile memory module 220 is coupled to the storage controller 210 (the memory interface control circuit 213) and stores data written by the host system 10. The rewritable non-volatile memory module 220 may be a single level cell (SLC) NAND flash memory module (i.e. a flash memory module that one memory cell may store 1 bit), a multi level cell (MLC) NAND flash memory module (i.e. a flash memory module that one memory cell may store 2 bits), a triple level cell (TLC)

NAND flash memory module (i.e. a flash memory module that one memory cell may store 3 bits), a 3D NAND flash memory module or a vertical NAND flash memory module, etc., or other memory modules having the same characteristics. The memory cells in the rewritable non-volatile memory module 220 are arranged in an array.

In the present embodiment, the memory cells in the rewritable non-volatile memory module 220 may construct a plurality of physical programming units (which are also referred to as physical sub-units), and the physical programming units may construct a plurality of physical blocks (which are also referred to as physical erasing units or physical units). To be specific, the memory cells on a same word line (or a same word line layer) may construct one or more physical programming units.

In the present embodiment, physical sub-unit is the smallest unit for writing (programming) data. Physical unit is the smallest unit for erasing data. Namely, each physical unit contains the least number of memory cells that are erased all together. Each of the physical units includes a plurality of physical sub-units. Physical sub-unit may be a physical page or a physical sector. In the present embodiment, the physical sub-unit includes a data bit area and a redundant bit area. The data bit area is used for storing user data, and the redundant bit area is used for storing system data. The system data is, for example, error correcting codes, error checking codes or meta data.

It should be noted that in the present embodiment, the system data used for recording information of a physical unit may be recorded by using one or more physical sub-units of the physical unit, or by using one or more physical sub-units of a specific physical unit used for recording all of the system data in one system area. In the present embodiment, the system data corresponding to one physical unit includes information such as a timestamp (which is also referred to as a global timestamp) of the physical unit. A magnitude of the timestamp (a value difference) may represent a time at which the corresponding physical unit was first used (written). A detailed format of the timestamp is not limited by the invention. For example, each time when the processor 211 performs a data writing operation to one (blank) physical unit allocated to a spare area, the physical unit written with data is allocated to a data area (for example, the physical unit would become an open physical unit), and the timestamp of the physical unit records a current storage device time or a system time. Namely, if a timestamp of one physical unit is greater than (later than) a timestamp of another physical unit, it represents that the one physical unit is allocated to the data area (or used by the processor 211) later than the other physical unit.

Moreover, in the present embodiment, after completing writing the L2P table or P2L table to the rewritable non-volatile memory module 220, the processor 211 also adds a timestamp to the written L2P table or P2L table to record a time when the L2P table or P2L table is written to the rewritable non-volatile memory module 220. However, the invention is not limited to the aforementioned method for determining a sequence of the writing time respectively corresponding to the L2P table, the P2L table and the physical unit.

The data writing operation (which is also referred to as a writing operation) is, for example, to program data corresponding to one logical address to one or more physical pages (which are also referred to as physical sub-units) of a physical unit according to a writing command, or to program the data to other types of physical addresses (for example, physical sectors) of the physical unit. In the present embodiment, when the data writing operation for one logical page (logical address) is completed (for example, the corresponding data is programmed to one physical page), the processor 211 correspondingly updates the L2P table to record an address of the physical page (physical address) corresponding to the logical address. Moreover, the processor 211 records the corresponding meta data to the redundant bit area corresponding to the physical page. In the present embodiment, the meta data may record a logical address mapped to the physical page. Namely, according to the meta data of one physical page storing one piece of data, the processor 211 may learn the logical address used for storing the data, and according to the physical address of the physical page, the processor 211 may determine that the logical address is mapped to the physical address (mapping relationship). In another embodiment, the meta data may also record a timestamp corresponding to the writing operation. Namely, when the data writing operation of the physical page is completed, the processor 211 may record one timestamp to record a present time for completing the data writing operation of the physical page.

The host system 10 allocates a plurality of logical units to the rewritable non-volatile memory module 220 through the storage controller 210. The allocated logical units are used for accessing user data stored in a plurality of physical units of the rewritable non-volatile memory module 220. Each of the logical units may be composed of one or more logical addresses. For example, the logical unit may be a logical block, a logical page or a logical sector. One logical unit may be mapped to one or more physical units, where the physical unit may be one or more physical addresses, one or more physical sectors, one or more physical programming units or one or more physical erasing units.

In the following embodiment, for simplicity's sake, logical unit refers to logical block, logical sub-unit refers to logical page, and logical address refers to corresponding logical page or address thereof. Each of the logical units has a plurality of logical pages (logical addresses). Physical unit refers to physical block, physical sub-unit refers to physical page, and physical address refers to corresponding physical page or address thereof. However, in another embodiment, one physical unit/physical sub-unit may be respectively composed of any number of memory cells, which is determined according to an actual requirement, and the physical address may refer to address of physical block or physical page.

Moreover, the storage controller 210 may establish a logical to physical (L2P) table and a physical to logical (P2L) table to record a mapping relationship between logical units (for example, logical blocks, logical pages, logical addresses or logical sectors) allocated to the rewritable non-volatile memory module 220 and physical units (for example, physical erasing units, physical programming units, physical addresses or physical sectors). In other words, the storage controller 210 may look up a physical unit mapped to a logical unit through the L2P table, and the storage controller 210 may look up a logical unit mapped to a physical unit through the P2L table. However, the aforementioned technical concept of mapping the logical units and the physical units is a commonly used technical means for those skilled in the art, and detail thereof is not repeated.

In an embodiment, the storage controller 210 further includes a buffer memory (which is also referred to as a memory hereinafter) and a power management circuit. The buffer memory is coupled to the processor 211, and is used for temporarily storing data and commands coming from the host system 10, data coming from the rewritable non-volatile memory module 220 or other system data (for example, L2P table and P2L table) used for managing the storage device 20, such that the processor 211 may quickly access the data, the command or the system data in the buffer memory. The power management circuit is coupled to the processor 211, and is used for controlling a power of the storage device 20.

Details of a data backup method of the invention are described below with reference of FIG. 1, FIG. 2, FIG. 3, and FIGS. 5A, 5B, 5C and 5D.

Figure 2:
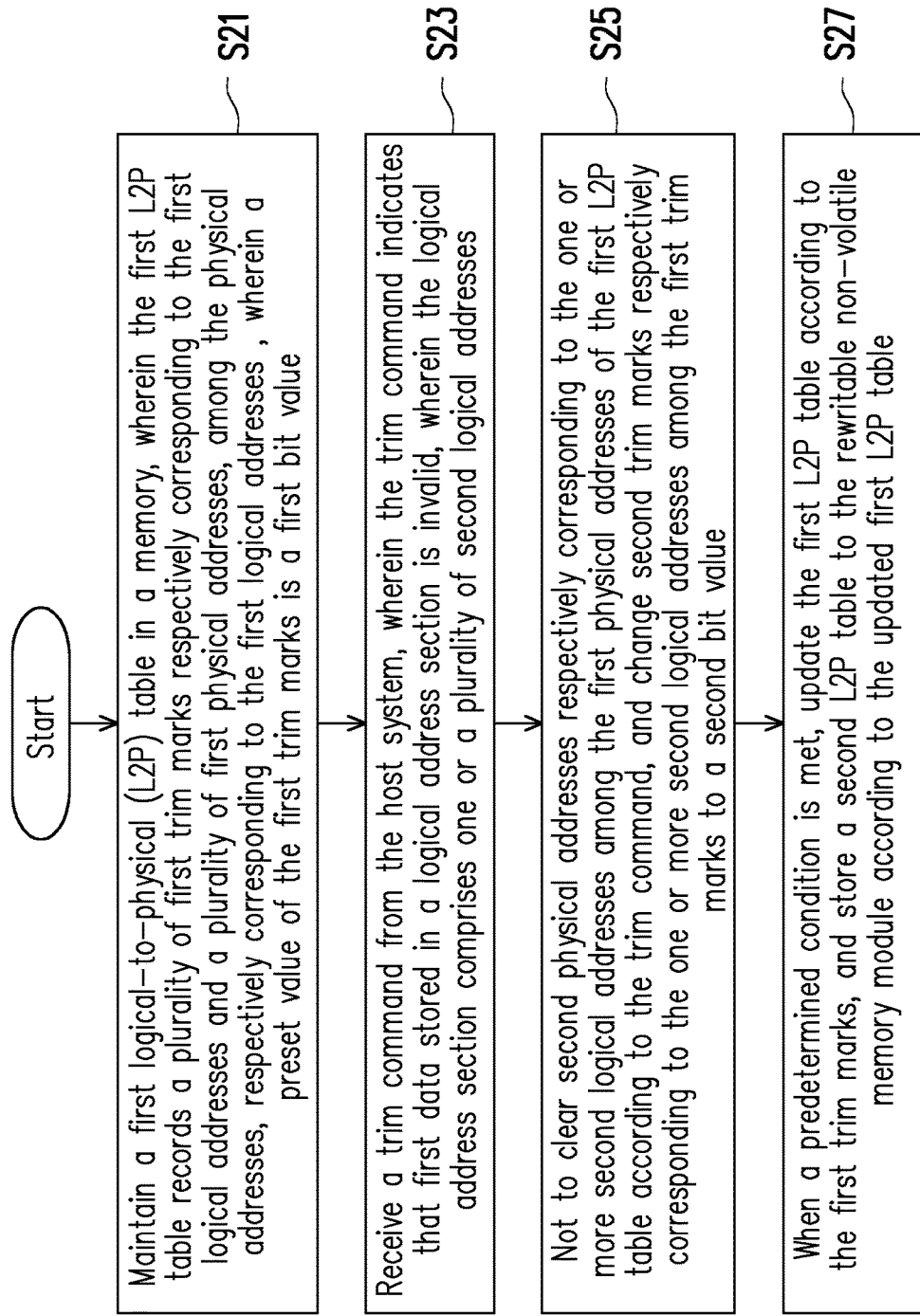
FIG. 2 is a flowchart illustrating a data backup method according to an embodiment of the invention.

FIG. 2 is a flowchart illustrating a data backup method according to an embodiment of the invention. Referring to FIG. 1 and FIG. 2, in step S21, the processor 211 maintains a first L2P table in a memory, where the first L2P table records a plurality of first trim marks respectively corresponding to a plurality of first logical addresses and a plurality of first physical addresses, among the physical addresses, respectively corresponding to the first logical addresses, wherein a preset value of the first trim marks is a first bit value. The first logical addresses are logical addresses allocated by the host system for storing data. Detail of the step S21 is described below with reference of FIG. 5A.

Figure 5A:
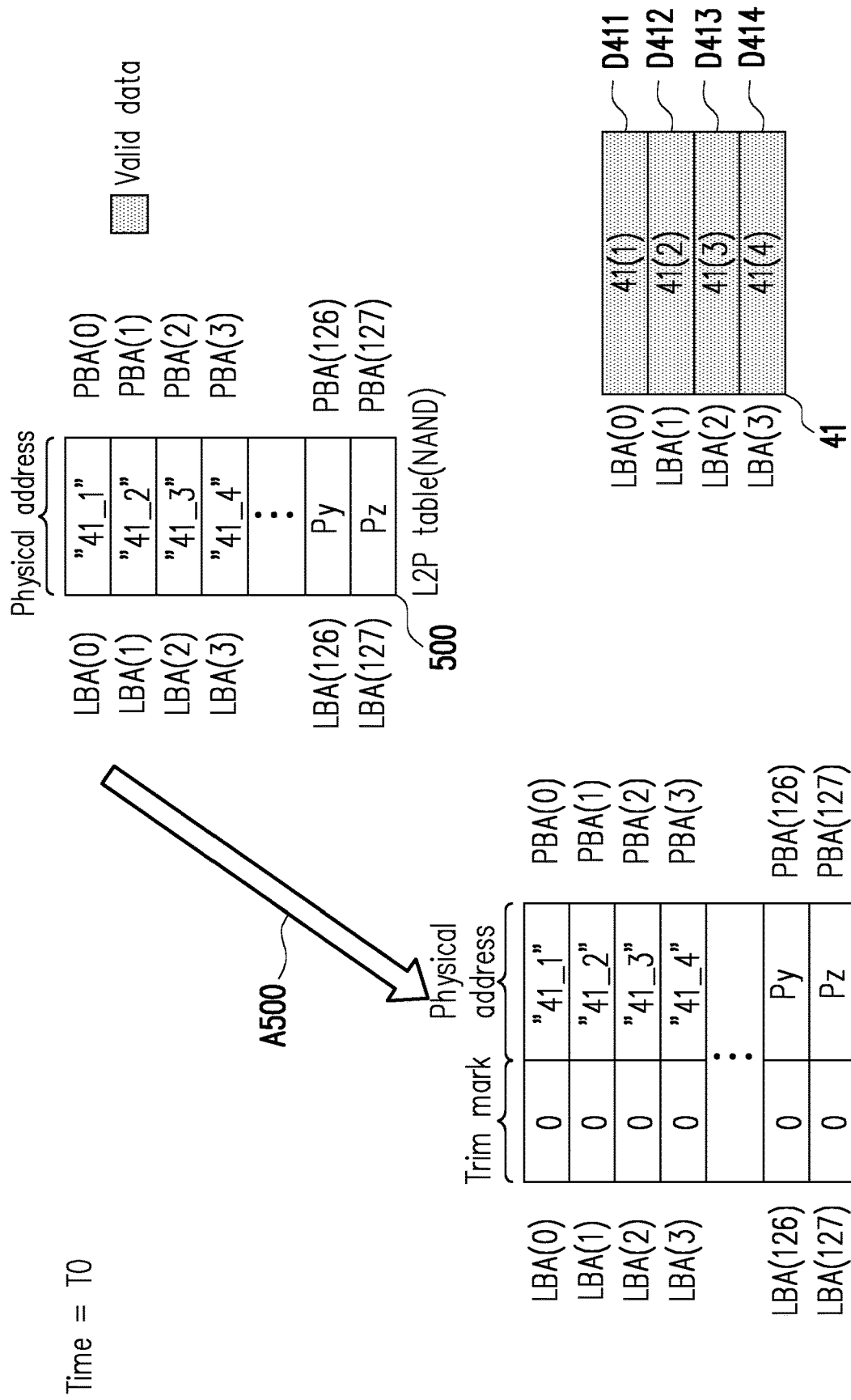
FIG. 5A is a schematic diagram of a L2P table according to an embodiment of the invention.

FIG. 5A is a schematic diagram of a L2P table according to an embodiment of the invention. Referring to FIG. 5A, for example, in the present embodiment, for convenience of description, it is assumed that the host system allocates 128 logical addresses (logical pages) LBA(0)-LBA(127) used for storing data, and the rewritable non-volatile memory module 220 is allocated with a plurality of physical units. Each of the physical units has 4 physical pages. For example, a physical unit 41 has 4 physical pages 41(1)-41(4).

The processor 211 maintains the L2P table 501 in the memory (buffer memory). In the present embodiment, the L2P table only uses one column of data field to sequentially record the physical addresses mapped to all of the logical addresses in a fixed order. For example, the L2P table recorded in the memory by the processor 211 may only record two types of data: the trim marks and the physical addresses (corresponding to each other), wherein the trim marks and the physical addresses are sequentially recorded and mapped to all of the logical addresses in a fixed order, and the processor 211 may identify a logical address corresponding to a physical address or a trim mark according to an order of the physical address or the trim mark recorded in the L2P table. Similarly, the L2P table stored in the rewritable non-volatile memory module 220 by the processor 211 may only record the physical addresses, and the processor 211 may identify a logical address corresponding to a physical address according to an order of the recorded physical address in the L2P table. In the present embodiment, an initial L2P table 501 is read from L2P table backup data (i.e. a L2P table 500) backed up (stored) in the rewritable non-volatile memory module 220 before. The L2P table 501 records information of physical addresses PBA(0)-PBA(127) respectively corresponding to 128 logical addresses LBA(0)-LBA(127) (which are also referred to as first logical addresses).

It is assumed that at a time T0, the L2P table 500 is read from the rewritable non-volatile memory module 220, and is stored to the memory to become the L2P table 501 (shown by an arrow A500). The physical addresses PBA(0), PBA(1), PBA(2), PBA(3), PBA(126), PBA(127) corresponding to the logical addresses LBA(0), LBA(1), LBA(2), LBA(3), LBA(126), LBA(127) in the L2P table 501 respectively record "41_1", "41_2", "41_3", "41_4", Py, Pz, and the physical unit 41 stores data D411, D412, D413, D414 in the $1^{st}$, $2^{nd}$, $3^{rd}$, $4^{th}$ physical pages 41(1), 41(2), 41(3), 41(4) (the physical addresses thereof are respectively "41_1", "41_2", "41_3", "41_4") of the physical unit 41, i.e. the physical pages 41(1)-41(4) are written with data D411, D412, D413, D414, and the above data D411, D412, D413, D414 is stored in the logical addresses LBA(0), LBA(1), LBA(2), LBA(3). The above example represents that the $1^{st}$, $2^{nd}$, $3^{rd}$, $4^{th}$ physical pages (physical addresses) in the physical unit 41 store valid data (shown as the gray background blocks of the physical unit 41 in FIG. 5A). In the above example, after the valid data D411, D412, D413, D414 is written to the physical unit 41, the L2P table 500 is backed up to the rewritable non-volatile memory module 220.

Moreover, in the present embodiment, the processor 211 may respectively record a plurality of trim marks (which are also referred to as first trim marks) corresponding to the logical addresses LBA(0)-LBA(126). The trim marks are also referred to as trim bits. When the L2P table is loaded to the memory for the first time, the trim marks are preset to a first bit value, for example, "0" (a preset value of the trim marks is "0"). In other words, different to the L2P table stored in the rewritable non-volatile memory module 220, the L2P table maintained in the memory has an additional field recording a plurality of trim marks respectively corresponding to a plurality of logical addresses (the trim marks are recorded in a sequence of the logical addresses, i.e. the trim marks also correspond to the plurality of physical addresses recorded by the L2P table).

It should be noted that if information recorded by a physical address corresponding to a logical address of the L2P table is "0", it represents that the logical address is not stored with valid data. If one logical address of the L2P table is not stored with any data, information recorded by the physical address corresponding to the logical address may be null (i.e. not stored with any information).

Referring back to FIG. 2, in step S23, the processor 211 receives a trim command from the host system, where the trim command indicates that first data stored in a logical address section is invalid, where the logical address section includes one or more second logical addresses. To be specific, as described above, when an operating system installed on the host system 10 deletes a certain batch of data, the operating system may transmit the trim command to the storage device 20 (the processor 211), such that the storage device 20 (the processor 211) may learn the logical address section where the deleted certain batch of data is located (i.e. the data on the logical addresses is deleted by the operating system). In other words, the processor 211 of the storage device 20 may learn that data stored in one logical address section is invalid (invalid data) through the received trim command.

Figure 5B:
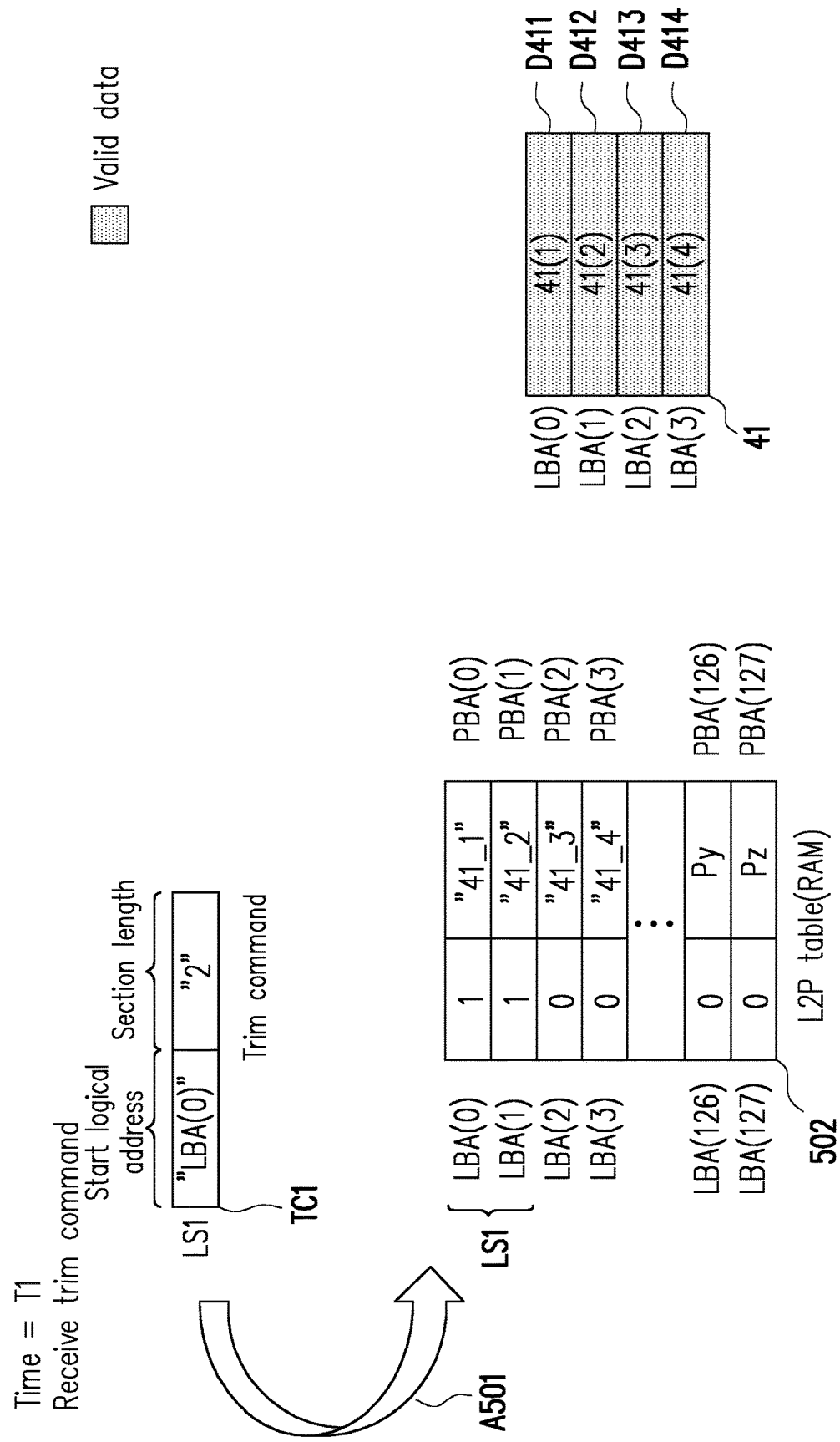
FIG. 5B is a schematic diagram of updating a L2P table according to a trim command according to an embodiment of the invention.

FIG. 5B is a schematic diagram of updating a L2P table according to a trim command according to an embodiment of the invention. For example, referring to FIG. 5B, it is assumed that at a time T1, the processor 211 receives a trim command TC1 from the host system 10, where the trim command TC1 indicates that the data stored in a logical address section LS1 is deleted (invalid). In the present embodiment, the trim command TC1 uses two types of information to record the logical address section LS1. For example, a start logical address represents (records) a first one logical address (logical page) of the logical address section, and a section length represents (records) a total length of the logical address section, i.e. a total number of the logical addresses (logical pages) included in the corresponding logical address section. For example, through the start logical address LBA(0) and the section length "2" of the logical address section LS1 indicated by the trim command TC1, it is learned that data presently stored in the logical address LBA(0) and the logical address LBA(1) (totally "2" logical addresses, which are also referred to as second logical addresses) is invalid (invalid data). It should be noted that the time T1 represents a time point later than T0. It should be noted that in other embodiment, the processor 211 may also use/receive a trim command with other type of data structure that is different to the aforementioned trim command to identify that data stored in one or more second logical addresses is invalid.

Referring to FIG. 2, in step S25, according to the trim command, the processor 211 does not clear second physical addresses among the first physical addresses of the first L2P table respectively corresponding to one or more second logical addresses, and changes second trim marks respectively corresponding to the one or more second logical addresses among the first trim marks to a second bit value.

Referring to FIG. 5B, for example, continuing the above example, after receiving the trim command TC1, the processor 211 may update the L2P table 501 into a L2P table 502 according to the logical address section LS1 indicated by the trim command TC1 (shown by an arrow A501).

Figure 4A:
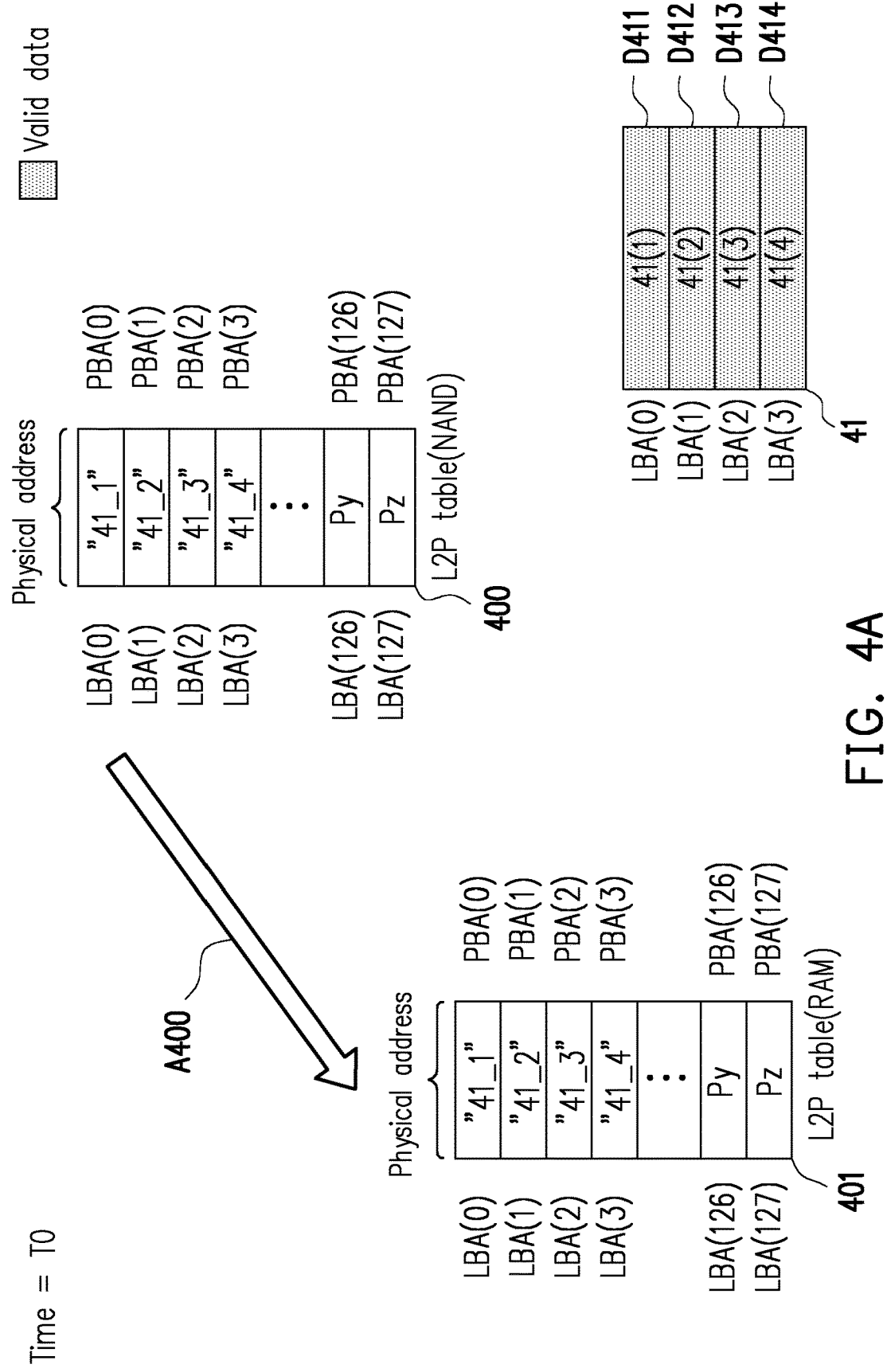
FIG. 4A is a schematic diagram of a L2P table drawn according to the conventional technique.
Figure 4B:
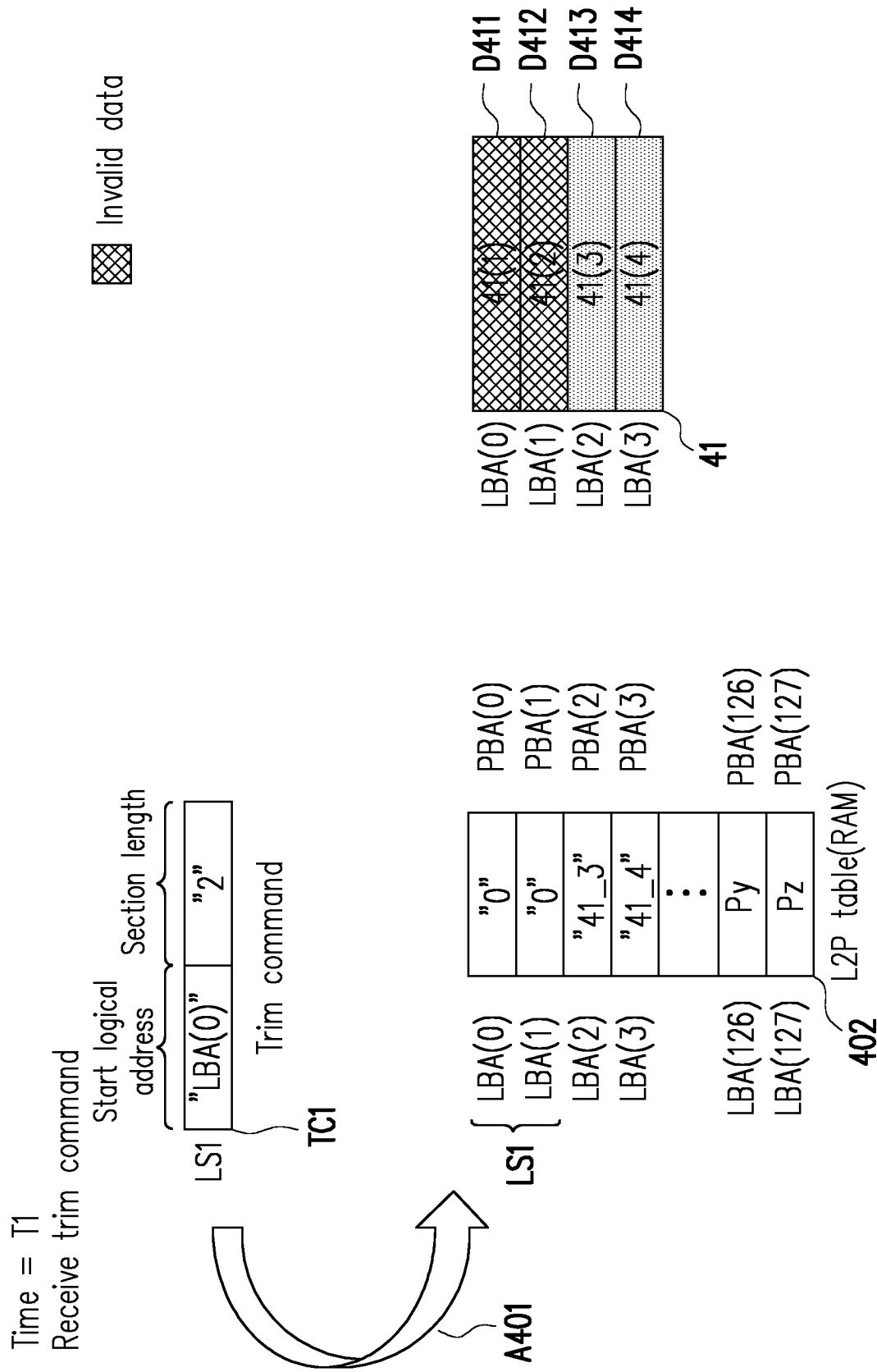
FIG. 4B is a schematic diagram of updating a L2P table according to a trim command based on the conventional technique.
Figure 4C:
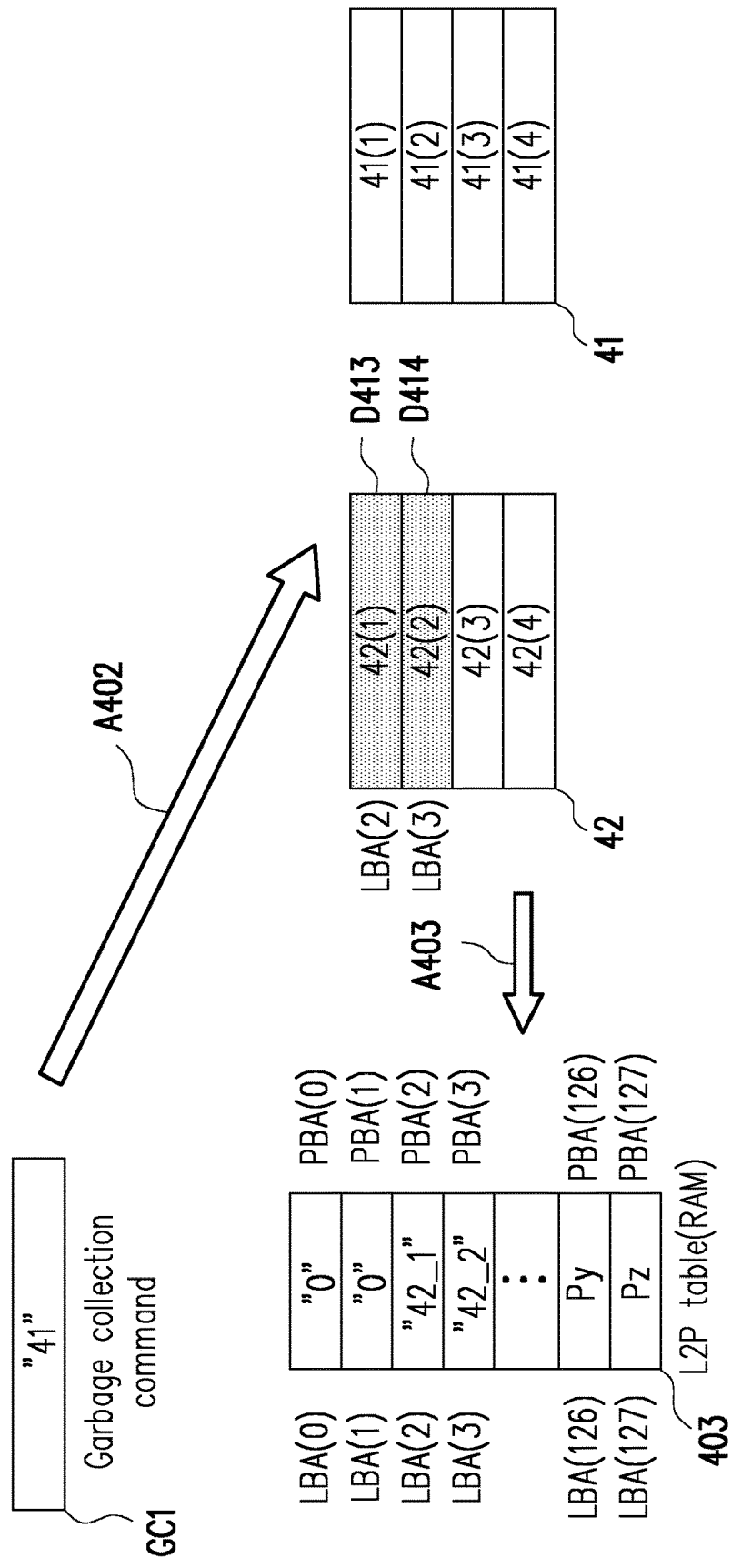
FIG. 4C is a schematic diagram of updating a L2P table according to an executed garbage collection command based on the conventional technique.
Figure 4D:
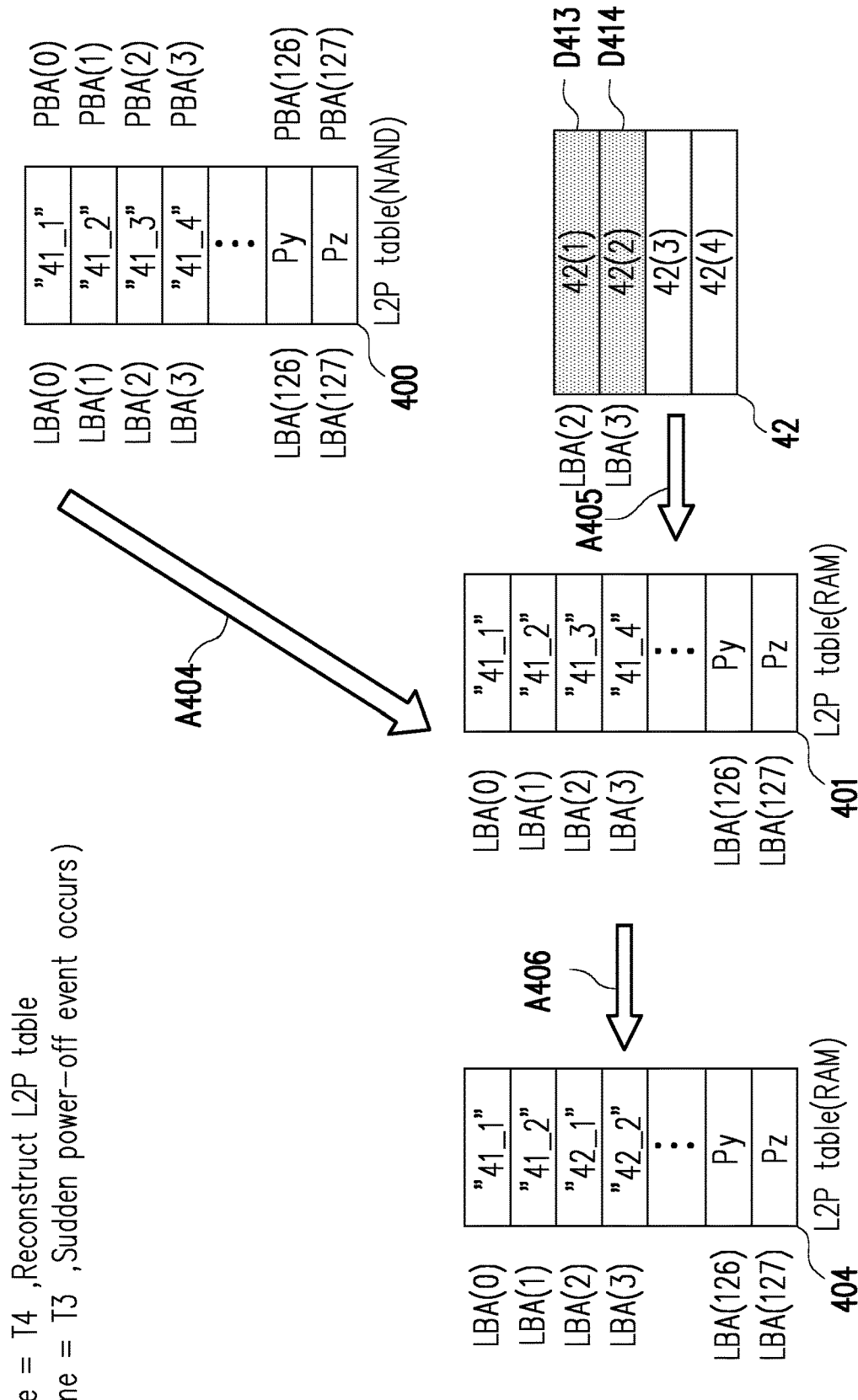
FIG. 4D is a schematic diagram of reconstructing a L2P table according to the conventional technique.

To be specific, although the logical address section LS1 indicates that the data stored in the second logical addresses LBA(0), LBA(1) is invalid, the processor 211 does not clear the physical addresses PBA(0), PBA(1) (which are also referred to as the second physical addresses) of the L2P table respectively corresponding to the second logical addresses LBA(0), LBA(1) according to the logical address section LS1 (which is different to the conventional method shown in FIG. 4B). For example, the processor 211 does not change the information "41_1" recorded in the physical address PBA(0) as "0", and does not change the information "41_2" recorded in the physical address PBA(1) as "0". In other words, the data stored in the physical pages 41(1), 41(2) of the physical unit 41 may be regarded as valid data by the processor 211. Moreover, the processor 211 may change the trim marks (which are also referred to as second trim marks) respectively corresponding to the second logical addresses LBA(0), LBA(1) from original "0" to "1" according to the logical address section LS1.

In other words, in the present embodiment, different to the conventional method, the processor 211 does not clear the physical addresses mapped to the corresponding second logical addresses of the L2P table according to the trim command, but the processor 211 may change the trim marks corresponding to the second logical addresses, change the value of the trim marks to the second bit value (non-preset value). In this way, in the garbage collection operation, the processor 211 regards that the data stored in the second logical addresses is valid. The embodiment would be described below by FIG. 5C.

Figure 5C:
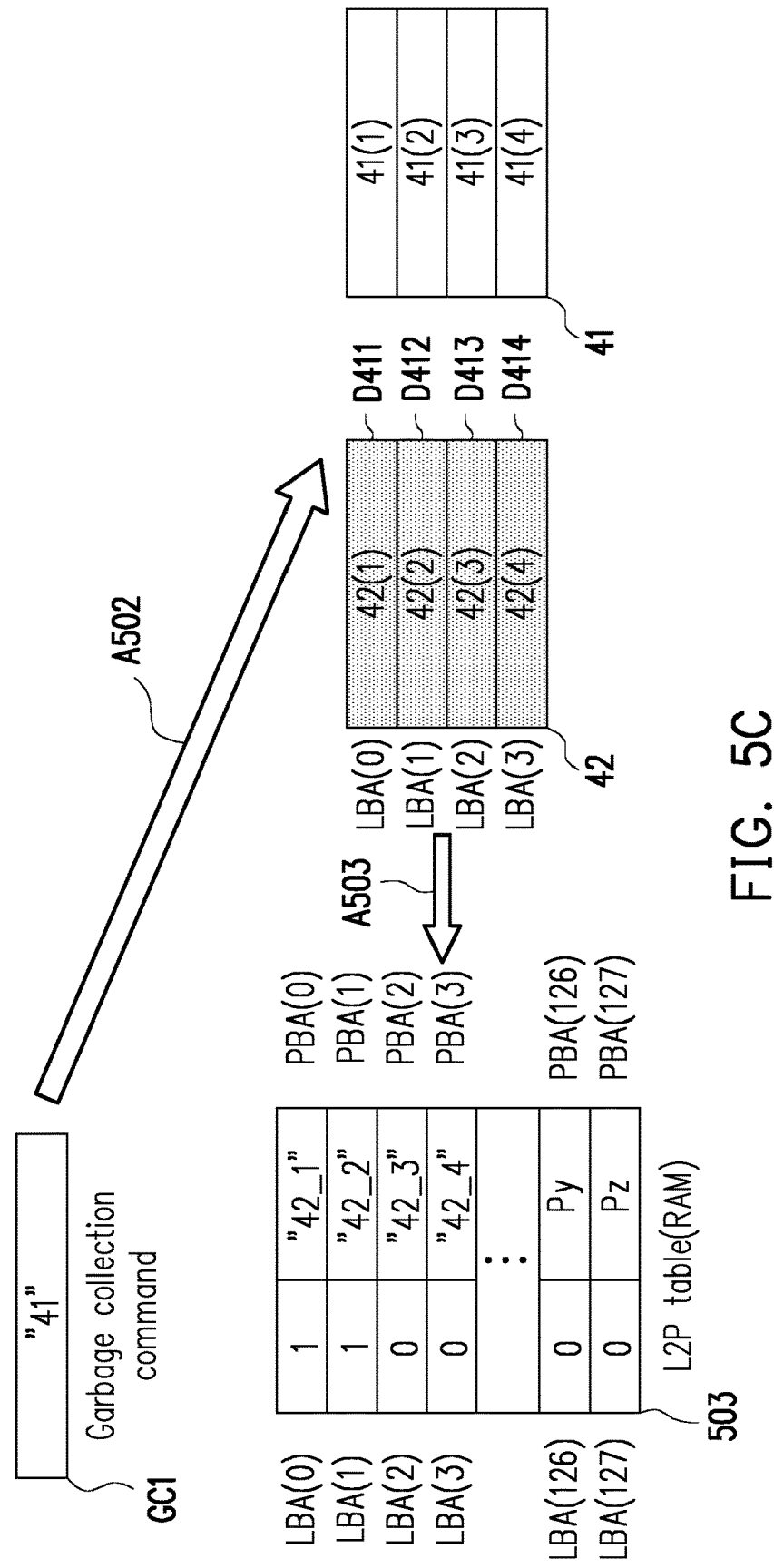
FIG. 5C is a schematic diagram of updating a L2P table according to an executed garbage collection command according to an embodiment of the invention.

FIG. 5C is a schematic diagram of updating the L2P table according to an executed garbage collection command according to an embodiment of the invention. Referring to FIG. 5C, at a time T2 after the time T1, the processor 211 receives a garbage collection command GC1. The garbage collection command GC1 records information (for example, "41") of the physical unit intending to execute the garbage collection operation. Namely, the garbage collection command GC1 indicates to execute the garbage collection operation on the physical unit 41. In this example, the data stored in the physical unit 41 includes data D411, D412 (which is also referred to as first data) of the second logical addresses corresponding to the trim command TC1 and other data D413, D414 (which is also referred to as second data).

In the present embodiment, the processor 211 may identify the corresponding logical addresses to be LBA(0)-LBA(3) according to the meta data of the physical pages of the data D411-D414, and according to the information "41_1"-"41_4" recorded in the physical addresses PBA(0)-PBA(3) corresponding to the logical addresses LBA(0)-LBA(3) of the L2P table 502, the processor 211 learns that the data D411-D414 is valid data. For example, the processor 211 identifies that the meta data of the physical page 41(1) corresponding to the data D411 records the logical address LBA(0) (for example, the information "LBA(0)" shown to the left of the physical page 41(1) of the physical unit 41 in FIG. 5B). Moreover, according to the logical address LBA(0) and the L2P table 502, the processor 211 identifies that the physical address corresponding to the logical address LBA(0) in the L2P table 502 is "41_1", which represents that the data stored in the logical address LBA(0) is stored in the physical page 41(1). Since the identified physical page 41(1) is complied with the aforementioned physical page used for storing the data D411, the processor 211 determines that the data D411 is valid. Deduced by analogy, according to the garbage collection command GC1 and the L2P table 502, the processor 211 may determine that the data D411-D414 in the physical unit 41 is valid data.

Then, the processor 211 selects an available physical unit 42, and copies the valid data in the physical unit 41 (i.e. the data D411, D412, D413, D414) to the physical unit 42, and executes an erasing operation to the physical unit 41 (such that the physical unit 41 may be continually used afterwards), so as to complete collecting the physical unit 41 (shown by an arrow A502). It should be noted that different to the conventional method, in the present embodiment, when the garbage collection operation is executed, the data D411, D412 corresponding to the trim command is regarded valid, and is copied to the new physical unit 42.

Then, the processor 211 correspondingly updates the L2P table 502 into a L2P table 503 according to the logical addresses and the physical addresses respectively used for storing the data D411, D412, D413, D414 (shown by an arrow A503). Namely, the processor 211 updates the L2P table 502 into the L2P table 503 according to the physical addresses "42_1", "42_2", "42_3", "42_4" of the physical pages 42(1), 42(2), 42(3), 42(4) and the logical addresses LBA(0), LBA(1), LBA(2), LBA(3) used for storing the valid data D411, D412, D413, D414. It should be noted that in the L2P table updated in response to the garbage collection operation, the first trim marks respectively corresponding to the first logical addresses LBA(0)-LBA(127) are not changed.

Referring back to FIG. 2, in step S27, when a predetermined condition is met, the processor 211 updates the first L2P table according to the first trim marks, and stores the second L2P table to the rewritable non-volatile memory module 220 according to the updated first L2P table.

To be specific, the L2P table updated according to the above steps S21-S25 is stored to the rewritable non-volatile memory module 220 when the predetermined condition is met. The predetermined condition is that, for example, after a fixed idle time, a time interval between the present time and the timestamp of the L2P table exceeds a predetermined time threshold, the invalid data indicated by the received trim command exceeds another predetermined amount, the data written according to the received writing command exceeds still another predetermined amount, etc., or a combination thereof. The above operation of storing the second L2P table to the rewritable non-volatile memory module according to the updated first L2P table may be referred to as a snapshot operation (which is also referred to as a L2P table backup operation) performed to the L2P table in the memory.

Figure 6:
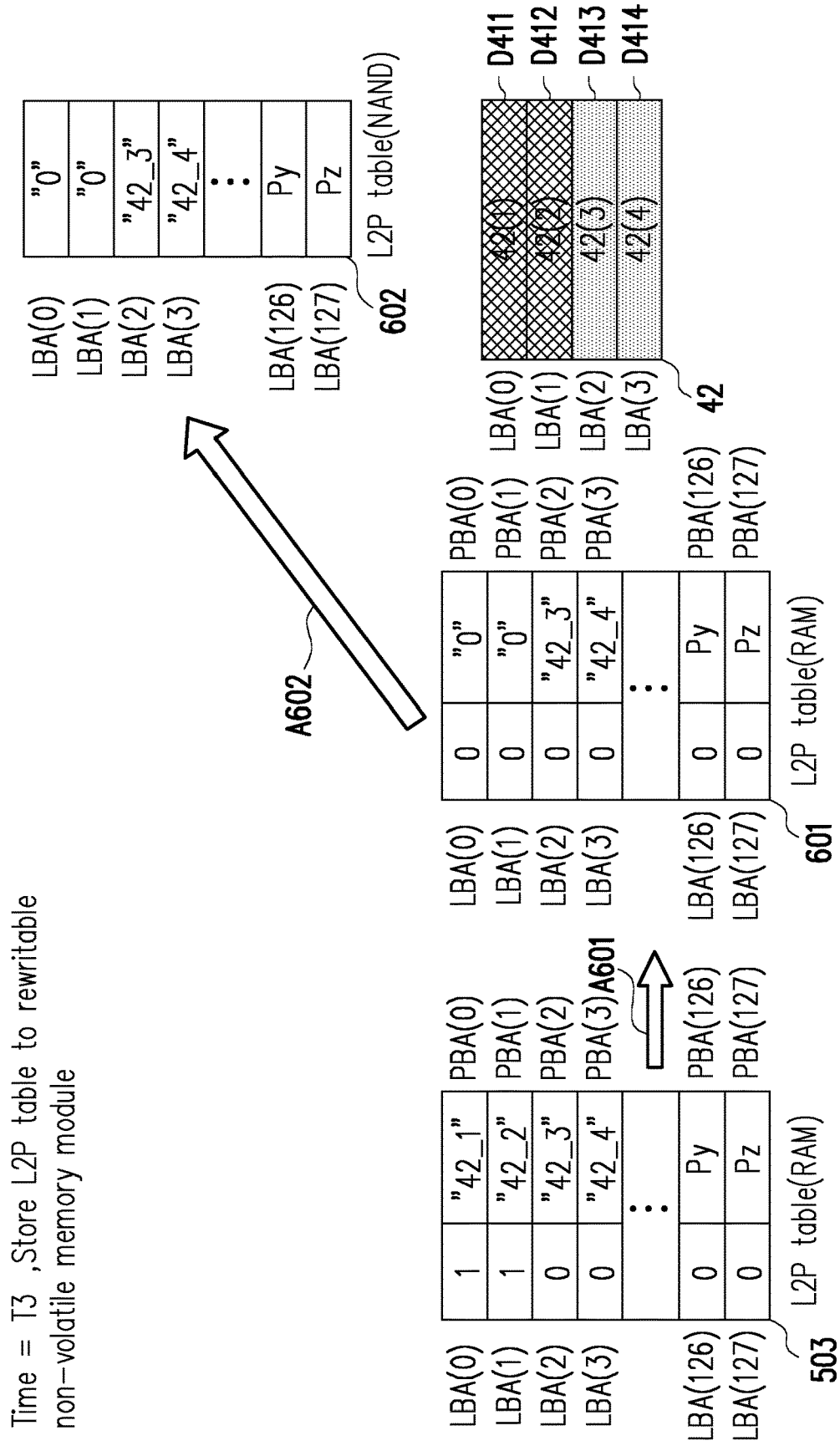
FIG. 6 is a schematic diagram of backing up a L2P table to a rewritable non-volatile memory module according to an embodiment of the invention.

FIG. 6 is a schematic diagram of backing up the L2P table to the rewritable non-volatile memory module according to an embodiment of the invention. Referring to FIG. 6, for example, in the present embodiment, continuing with the example of FIG. 5C, at a time T3 after the time T2, it is assumed that the predetermined condition is met, the processor 211 starts to back up the L2P table 503 to the rewritable non-volatile memory module 220.

At the beginning, before the processor 211 backs up the L2P table, the processor 211 may first update the corresponding physical address in the L2P table according to the trim marks being the second bit value (i.e., trim marks which is the second bit value). To be specific, the processor 211 identifies one or more trim marks (which are also referred to as fourth trim marks) being the second bit value (for example, "1") in all of the trim marks of the L2P table 503, and clears physical addresses (which are also referred to as fourth physical addresses), respectively corresponding to the one or more fourth trim marks, among the physical addresses PBA(0)-PBA(127) recorded in the L2P table 503. For example, the processor 211 identifies that the fourth trim marks are trim marks (with the second bit value "1") respectively corresponding to the second logical addresses LBA(0), LBA(1), and the processor 211 may clear information recorded in the physical addresses PBA(0), PBA(1) (which are also referred to as the fourth physical addresses) corresponding to the aforementioned fourth trim marks.

Moreover, the processor 211 further changes the one or more fourth trim marks to the first bit value ("0") (from the second bit value) to complete updating the L2P table 503, so as to obtain an updated L2P table 601 (shown by an arrow A601).

After obtaining the updated L2P table 601, the processor 211 may store a L2P table 602 to the rewritable non-volatile memory module 220 according to information of the first logical addresses LBA(0)-LBA(127) and the corresponding physical addresses PBA(0)-PBA(127) recorded in the L2P table 601 (shown by an arrow A602), where the L2P table 602 only records information of the physical addresses PBA(0)-PBA(127) respectively corresponding to the first logical addresses LBA(0)-LBA(127). Namely, the L2P table 602 (which is also referred to as L2P (NAND)) stored in the rewritable non-volatile memory module 220 does not have the first trim marks (the trim marks respectively corresponding to all of the first logical addresses) of the L2P table (RAM).

It should be noted that the L2P table 602 backed up to the rewritable non-volatile memory module 220 may correctly reflect the invalid data D411, D412 (shown as diamond grids of FIG. 6) stored in the logical addresses LBA(0), LBA(1) as indicated by the former trim command TC1. Namely, by using the L2P table to record the trim commands, when the L2P table is backed up, the invalid data indicated by all of the trim commands may be correctly reflected in the backed up L2P table (by clearing the physical addresses, corresponding to the invalid data, in the L2P table). A writing time of the L2P table 602 is later than a writing time of the physical unit 42.

It should be noted that in the present embodiment, conditions of changing the trim marks recorded by the L2P table between the first bit value and the second bit value include (1) when initialize L2P table in the memory, all of the trim marks therein are set to the first bit value; (2) according to the received trim command, the corresponding trim marks are changed to the second bit value; (3) when the backup operation of the L2P table in the memory is executed, the trim marks with the second bit value are changed to the first bit value; and (4) according to the received writing command, the corresponding trim marks are changed to the first bit value. The above condition (4) is describe below with reference of FIG. 7.

Figure 7:
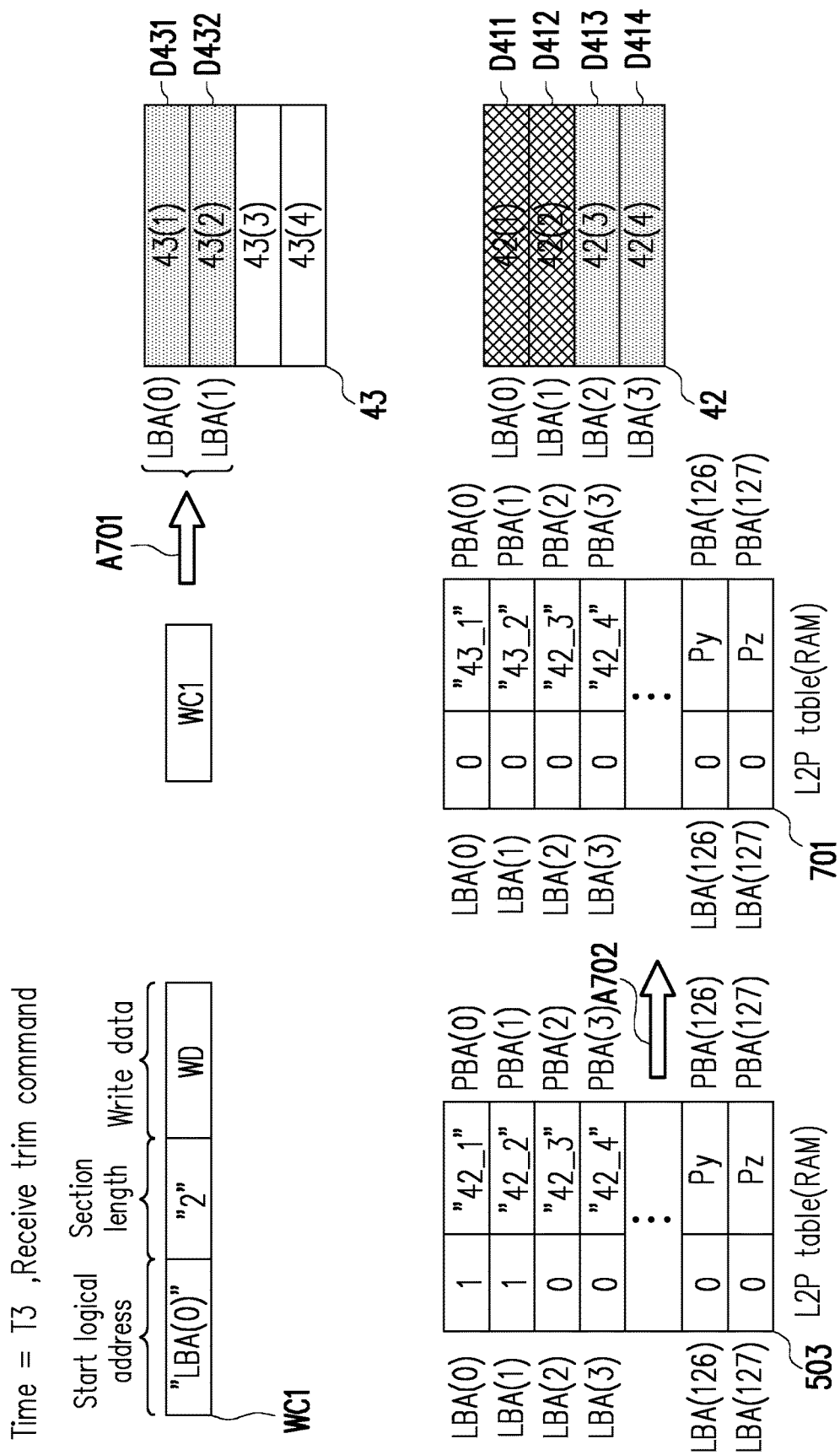
FIG. 7 is a schematic diagram of updating a L2P table according to a writing command according to an embodiment of the invention.

FIG. 7 is a schematic diagram of updating the L2P table according to the writing command according to an embodiment of the invention. Referring to FIG. 7, for example, continuing with the example of FIG. 5C, it is assumed that at the time T3 after the time T2, the processor 211 receives the writing command WC1. The writing command WC1 includes a start logical address, a section length and write data. To be specific, the writing command instructs the processor 211 to write the write data WD into the logical addresses LBA(0), LBA(1) (which are also referred to as third logical addresses), i.e. totally two logical addresses (logical pages). Namely, the logical section used for storing the write data WD includes "2" logical pages, and the logical address of the first logical page is LBA(0). The processor 211 sequentially stores the write data WD to the physical pages 43(1), 43(2) of the currently available physical unit 43 (which is also referred to as a third physical unit) according to the writing command WC1 (shown by an arrow A701). Namely, data D431, D432 stored in the physical pages 43(1), 43(2) construct the aforementioned write data WD.

It should be noted that after the processor 211 completes the writing operation of the write data WD (the data D431, D432 has been programmed to the physical pages 43(1), 43(2)), the processor 211 may update the L2P table 503 according to the addresses (the physical addresses "43_1", "43_2") of the third physical pages 43(1), 43(2) and the corresponding third logical addresses LBA(0), LBA(1) (shown by an arrow A702). Moreover, the processor 211 changes the trim marks (which are also referred to as third trim marks) respectively corresponding to the third logical addresses LBA(0), LBA(1) to the first bit value ("0") according to the third logical addresses LBA(0), LBA(1) corresponding to the writing command WC1. In other words, the third trim marks are changed from the second bit value to the first value due to that valid data is stored in the corresponding logical addresses through the writing command. Finally, after completing updating the L2P table 503 according to the writing command, the processor 211 obtains a L2P table 701.

Figure 5D:
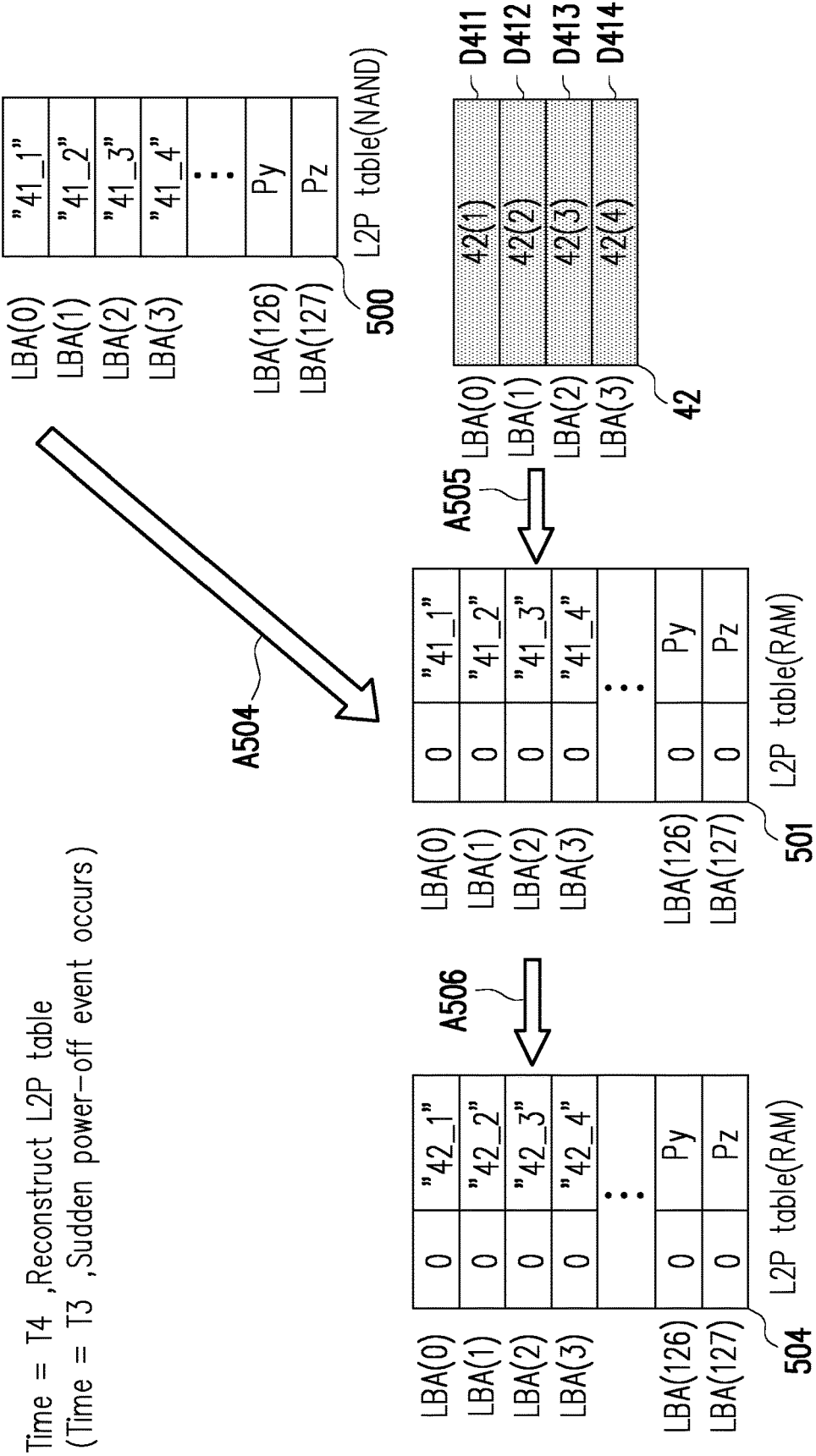
FIG. 5D is a schematic diagram of reconstructing a L2P table according to an embodiment of the invention.

A data recovery method of the invention is described below with reference of FIG. 1, FIG. 3 and FIG. 5D.

Figure 3:
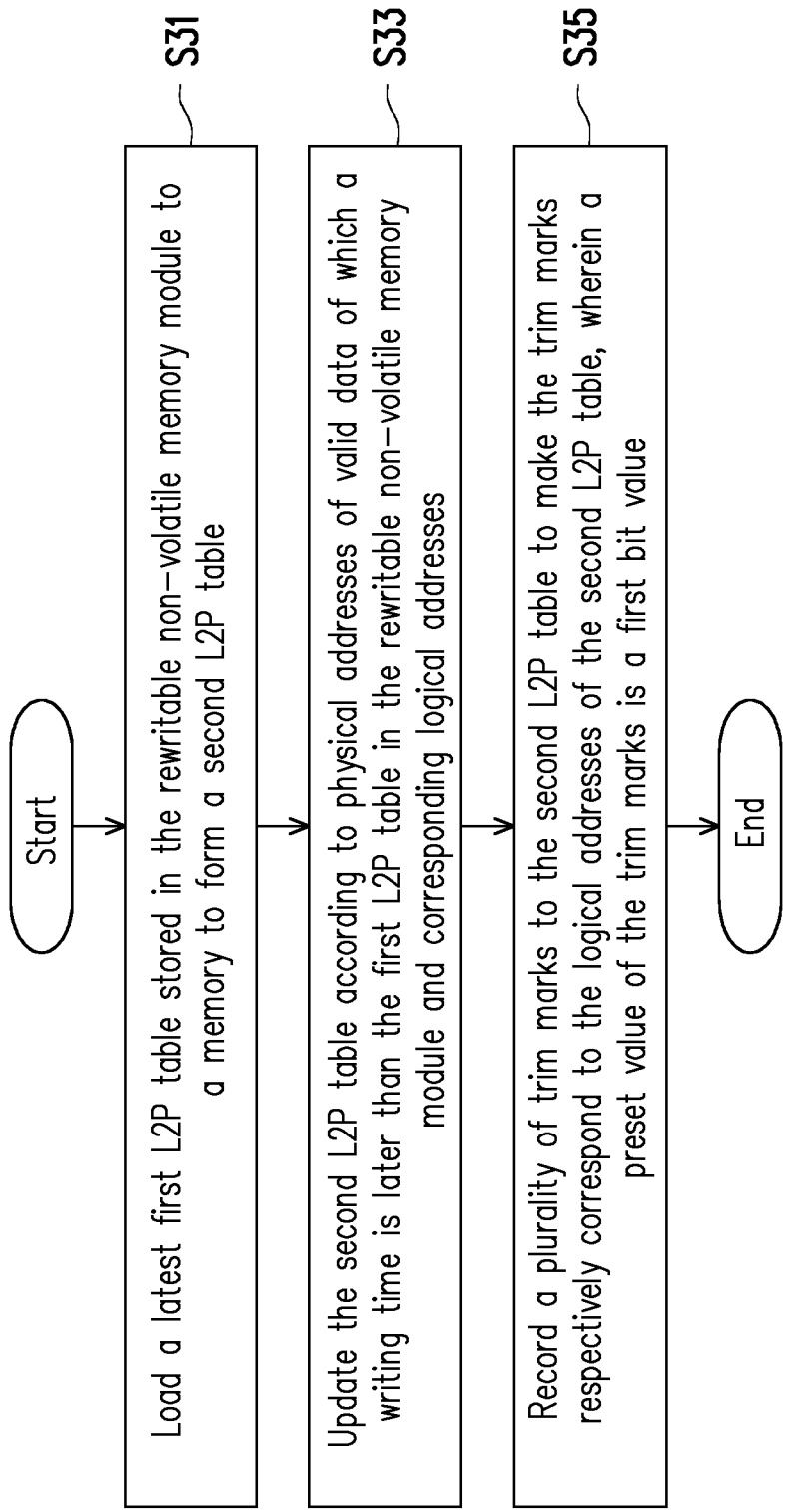
FIG. 3 is a flowchart illustrating a data recovery method according to an embodiment of the invention.

FIG. 3 is a flowchart illustrating a data recovery method according to an embodiment of the invention. FIG. 5D is a schematic diagram of reconstructing a L2P table according to an embodiment of the invention. For example, referring to FIG. 5D, continuing with the former example of FIG. 5C, it is assumed that a sudden power-off event occurs at the time T3 after the time T2. Since the L2P table 503 originally (for example, at the time T2) stored in the memory is lost due to the sudden power-off after the storage device 20 is power on, the processor 211 may detect the occurrence of the sudden power-off event, and correspondingly execute a data recovery operation. In the data recovery operation, at a time T4 later than the time T3, the processor 211 may first reconstruct the L2P table. At the beginning, referring to FIG. 3, in step S31, the processor 211 loads the latest first L2P table stored in the rewritable non-volatile memory module 220 to the memory to form a second L2P table. For example, the processor first reads the latest L2P table 500 from the rewritable non-volatile memory module 220 to the memory (shown by an arrow A504) to form the L2P table 501.

In step S33, the processor 211 updates the second L2P table according to physical addresses of valid data of which a writing time is later than the first L2P table in the rewritable non-volatile memory module and corresponding logical addresses.

For example, the processor 21 reads meta data corresponding to all of the physical units written with any data to find the valid data of which the writing time is later than the writing time of L2P table 500. Then, the processor 211 updates the L2P table 501 according to the logical addresses and the physical addresses corresponding to the found valid data.

For example, the processor 211 may identify that a timestamp of the physical unit 41 where the data D411, D412, D413, D414 respectively stored in the physical pages 42(1)-42(4) of the current physical unit 42 belongs to is greater than a timestamp of the L2P table 500. Namely, a time for writing the data D411, D412, D413, D414 is all later than a time for backing up the L2P table 500 to the rewritable non-volatile memory module 220. Therefore, the processor 211 may perform the data recovery operation according to the data D411, D412, D413, D414. The processor 211 may further reconstruct (update) the L2P table 501 according to the corresponding physical addresses "42_1", "42_2", "42_3", "42_4" and the logical addresses LBA(0), LBA(1), LBA(2), LBA(3) of the data D411, D412, D413, D414 (shown by an arrow A505), so as to obtain the reconstructed L2P table 504 (shown by an arrow A506).

In step S35, the processor 211 records a plurality of trim marks to the second L2P table to make the trim marks respectively correspond to the logical addresses of the second L2P table, wherein a preset value of the trim marks is the first bit value.

To be specific, as described above, different to the L2P stored in the rewritable non-volatile memory module 220, the L2P tables 501, 504 maintained in the memory may record the trim marks respectively corresponding to the logical addresses LBA(0)-LBA(127). In the data recovery operation, in the L2P table 501 obtained by reading the latest L2P table 500, all of the trim marks of the L2P table 501 are set to the preset value "0" (the first bit value).

In summary, the data backup method, the data recovery method and the storage controller provided by the invention may use the trim marks recorded in the L2P table to update the trim marks and the L2P table according to the received trim command, the garbage collection command, the writing command and the executed L2P table backup operation, so as to avoid the problem of correctness reduction of the reconstructed L2P table in case that the sudden power-off event occurs when the latest L2P table has not been backed up to the rewritable non-volatile memory module yet, and improve performance and security of the storage device of the storage device having the rewritable non-volatile memory module.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data backup method, adapted to a storage device having a rewritable non-volatile memory module, wherein the rewritable non-volatile memory module has a plurality of physical units, and the rewritable non-volatile memory module is configured with a plurality of physical addresses, wherein a plurality of logical addresses are configured to a host system coupled to the storage device, the data backup method comprising:

maintaining a first logical-to-physical table in a memory, wherein the first logical-to-physical table records a plurality of first trim marks respectively corresponding to a plurality of first logical addresses and a plurality of first physical addresses, among the physical addresses, respectively corresponding to the first logical addresses, wherein a preset value of the first trim marks is a first bit value;

receiving a trim command from the host system, wherein the trim command indicates that first data stored in a logical address section is invalid, wherein the logical address section comprises one or more second logical addresses;

not clearing second physical addresses, among the first physical addresses of the first logical-to-physical table, respectively corresponding to the one or more second logical addresses according to the trim command, and changing second trim marks, among the first trim marks, respectively corresponding to the one or more second logical addresses to a second bit value; and when a predetermined condition is met, updating the first logical-to-physical table according to the first trim marks, and storing a second logical-to-physical table to the rewritable non-volatile memory module according to the updated first logical-to-physical table, wherein the second logical-to-physical table only comprises the first physical addresses respectively corresponding to the first logical addresses in the updated first logical-to-physical table, and does not comprise the first trim marks.

2. The data backup method as claimed in claim 1, further comprising:

receiving a garbage collection command, wherein the garbage collection command indicates to execute a garbage collection operation to a first physical unit, wherein data stored in the first physical unit comprises second data and the first data stored in the one or more second logical addresses of the logical address section;

executing the garbage collection operation to copy the second data of the first physical unit and the first data stored in the one or more second logical addresses to a second physical unit; and updating the first logical-to-physical table according to a plurality of logical addresses and a plurality of physical addresses of the first data and the second data stored to the second physical unit, wherein the first trim marks of the first logical-to-physical table are not changed.

3. The data backup method as claimed in claim 1, further comprising:

receiving a writing command, wherein the writing command indicates to store write data to a third logical address among the one or more second logical addresses;

executing the writing command to program the write data to a third physical address; and changing a third trim mark, among the first trim marks recorded in the first logical-to-physical table, corresponding to the third logical address to the first bit value, and updating the first logical-to-physical table according to the third physical address and the third logical address.

4. The data backup method as claimed in claim 1, wherein the step of updating the first logical-to-physical table according to the first trim marks when the predetermined condition is met comprises:
when the predetermined condition is met, identifying one or more fourth trim marks, among the first trim marks of the first logical-to-physical table, being the second bit value, and clearing fourth physical addresses, among the first physical addresses recorded by the first logical-to-physical table, respectively corresponding to the one or more fourth trim marks; and
changing the one or more fourth trim marks to the first bit value to complete updating the first logical-to-physical table.

5. A data recovery method, adapted to a storage device having a rewritable non-volatile memory module, wherein the rewritable non-volatile memory module has a plurality of physical units, and the rewritable non-volatile memory module is configured with a plurality of physical addresses, wherein a plurality of logical addresses are configured to a host system coupled to the storage device, the data recovery method comprising:
loading a latest first logical-to-physical table stored in the rewritable non-volatile memory module to a memory to form a second logical-to-physical table, wherein the first logical-to-physical table and the second logical-to-physical table all record a plurality of first physical addresses, among the physical addresses, respectively corresponding to the logical addresses, wherein the first logical-to-physical table only comprises the first physical addresses respectively corresponding to the logical addresses, and the first logical-to-physical table does not comprise any trim mark;
updating the second logical-to-physical table according to physical addresses of valid data of which a writing time is later than the first logical-to-physical table in the rewritable non-volatile memory module and corresponding logical addresses; and
recording a plurality of trim marks to the second logical-to-physical table to make the trim marks respectively correspond to the logical addresses of the second logical-to-physical table, wherein a preset value of the trim marks is a first bit value.

6. A storage controller, used for controlling a storage device having a rewritable non-volatile memory module, the storage controller comprising:
a connection interface circuit, coupled to a host system, wherein a plurality of logical addresses are configured to the host system;
a memory interface control circuit, coupled to the rewritable non-volatile memory module, wherein the rewritable non-volatile memory module has a plurality of physical units, and the rewritable non-volatile memory module is configured with a plurality of physical addresses; and
a processor, coupled to the connection interface circuit and the memory interface control circuit,
wherein the processor maintains a first logical-to-physical table in a memory, wherein the first logical-to-physical table records a plurality of first trim marks respectively corresponding to a plurality of first logical addresses and a plurality of first physical addresses, among the physical addresses, respectively corresponding to the first logical addresses, wherein a preset value of the first trim marks is a first bit value,
wherein the processor receives a trim command from the host system, wherein the trim command indicates that first data stored in a logical address section is invalid, wherein the logical address section comprises one or more second logical addresses,
wherein the processor does not clear second physical addresses, among the first physical addresses of the first logical-to-physical table, respectively corresponding to the one or more the second logical addresses according to the trim command, and changes second trim marks, among the first trim marks, respectively corresponding to the one or more second logical addresses to a second bit value,
wherein when a predetermined condition is met, the processor updates the first logical-to-physical table according to the first trim marks, and stores a second logical-to-physical table to the rewritable non-volatile memory module according to the updated first logical-to-physical table, wherein the second logical-to-physical table only includes the first physical addresses respectively corresponding to the first logical addresses of the updated first logical-to-physical table, and does not include the first trim marks.

7. The storage controller as claimed in claim 6,
wherein the processor receives a garbage collection command, wherein the garbage collection command indicates to execute a garbage collection operation to a first physical unit, wherein data stored in the first physical unit comprises second data and the first data stored in the one or more second logical addresses of the logical address section,
wherein the processor executes the garbage collection operation to copy the second data of the first physical unit and the first data stored in the one or more second logical addresses to a second physical unit,
wherein the processor updates the first logical-to-physical table according to a plurality of logical addresses and a plurality of physical addresses of the first data and the second data stored to the second physical unit, wherein the first trim marks of the first logical-to-physical table are not changed.

8. The storage controller as claimed in claim 6,
wherein the processor receives a writing command, wherein the writing command indicates to store write data to a third logical address among the one or more second logical addresses,
wherein the processor executes the writing command to program the write data to a third physical address,
wherein the processor changes a third trim mark, among the first trim marks recorded in the first logical-to-physical table, corresponding to the third logical address to the first bit value, and updates the first logical-to-physical table according to the third physical address and the third logical address.

9. The storage controller as claimed in claim 6, wherein in the operation that the processor updates the first logical-to-physical table according to the first trim marks when the predetermined condition is met,
when the predetermined condition is met, the processor identifies one or more fourth trim marks, among the first trim marks of the first logical-to-physical table, being the second bit value, and clears fourth physical addresses, among the first physical addresses recorded by the first logical-to-physical table, respectively corresponding to the one or more fourth trim marks, wherein the processor changes the one or more fourth trim marks to the first bit value to complete updating the first logical-to-physical table.

10. A storage controller, used for controlling a storage device having a rewritable non-volatile memory module, the storage controller comprising:

a connection interface circuit, coupled to a host system, wherein a plurality of logical addresses are configured to the host system;

a memory interface control circuit, coupled to the rewritable non-volatile memory module, wherein the rewritable non-volatile memory module has a plurality of physical units, and the rewritable non-volatile memory module is configured with a plurality of physical addresses; and a processor, coupled to the connection interface circuit and the memory interface control circuit, wherein the processor loads a latest first logical-to-physical table stored in the rewritable non-volatile memory module to a memory to form a second logical-to-physical table, wherein the first logical-to-physical table and the second logical-to-physical table all record a plurality of first physical addresses, among the physical addresses, respectively corresponding to the logical addresses, wherein the first logical-to-physical table only comprises the first physical addresses respectively corresponding to the logical addresses, and the first logical-to-physical table does not comprise any trim mark, wherein the processor updates the second logical-to-physical table according to physical addresses of valid data of which a writing time is later than the first logical-to-physical table in the rewritable non-volatile memory module and corresponding logical addresses, the processor further records a plurality of trim marks to the second logical-to-physical table to make the trim marks respectively correspond to the logical addresses of the second logical-to-physical table, wherein a preset value of the trim marks is a first bit value.

* * * * *